US011995860B2

(12) United States Patent
Wang et al.

(10) Patent No.: US 11,995,860 B2
(45) Date of Patent: May 28, 2024

(54) BUBBLE MEASUREMENT SYSTEM AND METHOD

(71) Applicant: TE Connectivity Services GmbH, Schaffhausen (CH)

(72) Inventors: Shu Wang, Middletown, PA (US); Du Wen, Reading, PA (US); Roberto Francisco-Yi Lu, Bellevue, WA (US); Jiankun Zhou, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 215 days.

(21) Appl. No.: 17/646,916

(22) Filed: Jan. 4, 2022

(65) Prior Publication Data

US 2023/0215032 A1      Jul. 6, 2023

(51) Int. Cl.
| | |
|---|---|
| *G06T 7/62* | (2017.01) |
| *G01B 11/04* | (2006.01) |
| *G01B 11/10* | (2006.01) |
| *G01B 11/28* | (2006.01) |
| *G01F 1/74* | (2006.01) |
| *G01N 21/85* | (2006.01) |
| *G01N 21/17* | (2006.01) |

(52) U.S. Cl.
CPC .............. *G06T 7/62* (2017.01); *G01B 11/043* (2013.01); *G01B 11/10* (2013.01); *G01B 11/28* (2013.01); *G01F 1/74* (2013.01); *G01N 21/85* (2013.01); *G01N 2021/1765* (2013.01); *G01N 2201/12723* (2013.01); *G06T 2207/20084* (2013.01)

(58) Field of Classification Search
CPC ............ G06T 7/62; G06T 2207/20084; G01B 11/043; G01B 11/10; G01B 11/28; G01F 1/74; G01N 21/85; G01N 2021/1765; G01N 2201/12723
USPC .......................................................... 348/135
See application file for complete search history.

(56) References Cited

U.S. PATENT DOCUMENTS

| | | | | |
|---|---|---|---|---|
| 2010/0328452 | A1* | 12/2010 | Jung ..................... | G06V 20/52 348/135 |
| 2013/0116703 | A1* | 5/2013 | Kosar ................. | A61B 17/2251 606/128 |
| 2013/0188040 | A1* | 7/2013 | Kamen .................. | G16H 40/63 348/135 |
| 2016/0335779 | A1* | 11/2016 | Satish .................. | G06V 10/764 |

(Continued)

OTHER PUBLICATIONS

International Search Report, International App. No PCT/IB2022/050064 International Filing Date Jan. 4, 2023.

(Continued)

*Primary Examiner* — Frantz B Jean

(57) ABSTRACT

A bubble measurement system includes a bubble detector including a vessel having a flow path configured to receive a flow of fluid including air bubbles from a bubble generator and an imaging system. The imaging system includes an imaging device for imaging the fluid and air bubbles in the flow path of the vessel of the bubble detector. The imaging system has an imaging controller coupled to the imaging device and receiving images from the imaging device. The imaging controller processes the images to measure bubble size of each air bubble passing through the bubble detector. The imaging controller includes a pairing module comparing successive images and the air bubbles in successive images to measure all bubbles flowing through the vessel.

25 Claims, 5 Drawing Sheets

(56) References Cited

U.S. PATENT DOCUMENTS

| | | | |
|---|---|---|---|
| 2019/0159786 A1* | 5/2019 | Balfour | B01F 23/235 |
| 2022/0044421 A1* | 2/2022 | Williams | G01N 11/02 |
| 2022/0092774 A1* | 3/2022 | Kohle | G06N 3/045 |
| 2022/0270297 A1* | 8/2022 | Koh | G06T 7/60 |
| 2023/0194555 A1* | 6/2023 | Dobromyslin | G06T 7/0012 |
| | | | 356/40 |

OTHER PUBLICATIONS

Haas Tim et al. "BubCNN: Bubble Detection Using Faster RCNN and Shape Regression Network", Chemical Engineering Science, Oxford, GB vol. 216 Jan. 7, 2020.

Wang Qianwen et al. "Bubble Recognizing and Tracking In A Plate Heat Exchanger By Using Image Processing and Convolution Neural Network", International Journal of Multiphase Flow, Elsevier, Amsterdam, NL. vol. 138 Feb. 13, 2021.

Zaruba A et al. "Experimental Study on bubble motion in a rectangular bubble column using high-speed video observations", Flow Measurement and Instrumentation Butterworth-Heinemann, Oxford, GB vol. 16 No. 5, Oct. 1, 2005.

\* cited by examiner

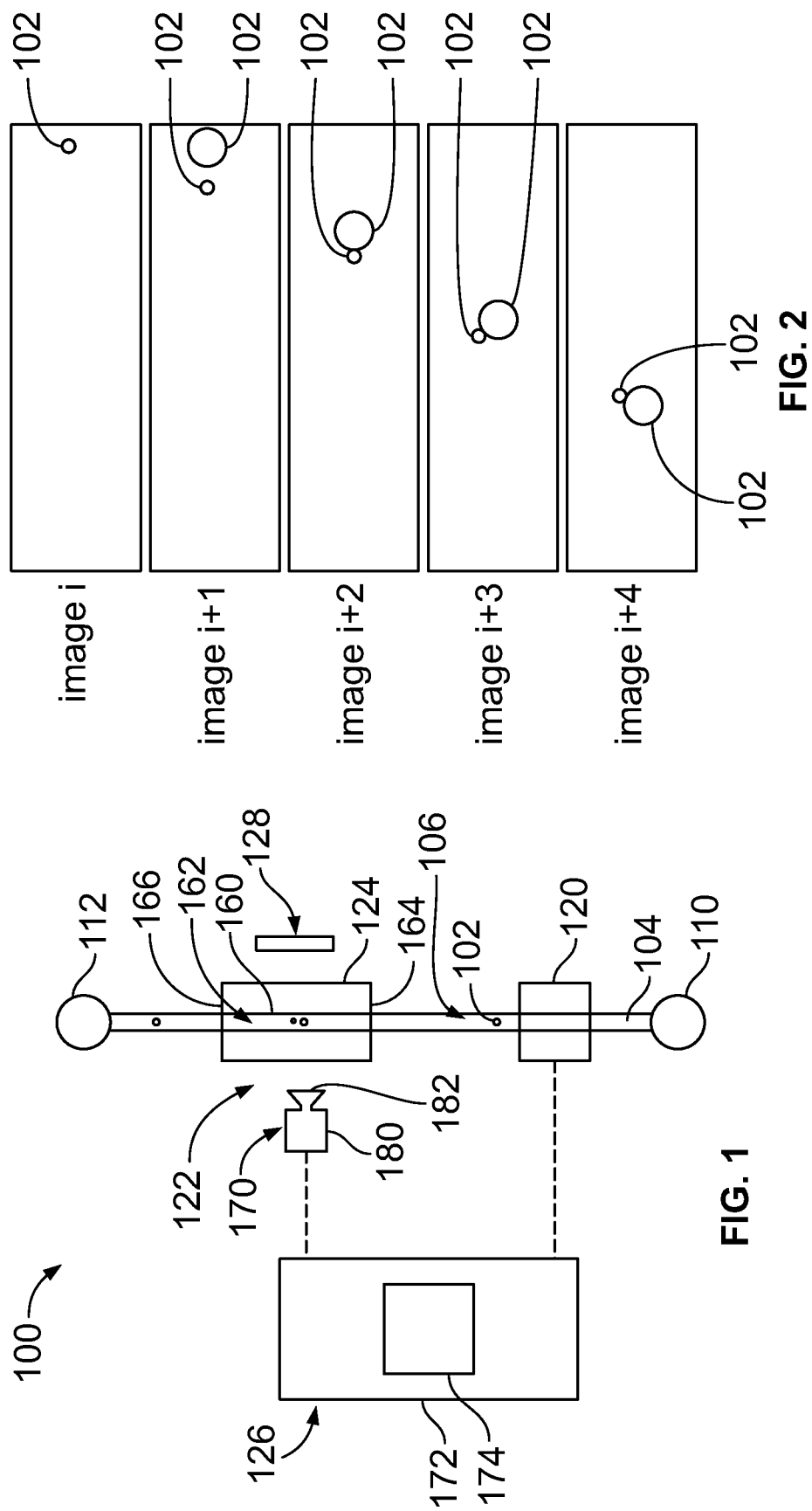

BUBBLE MEASUREMENT SYSTEM AND METHOD

BACKGROUND OF THE INVENTION

The subject matter herein relates generally to methods and apparatus for air bubble measurement.

Reliable detection of air bubbles in liquid is critical for many applications, such as medical dosing applications. Known air bubble detection sensors attach to vessels, such as IV tubes, to detect air bubbles in the vessel. Detection of bubble size is an important specification of the sensors. The sensors are calibrated using a testing system that includes a bubble generator, which generates air bubbles of known size and quantity in water or other transparent or semi-transparent fluid. The air bubbles from the bubble generator flow through the sensor for testing. A bubble generator capable of repeatably generating consistent bubbles at various flow rates is necessary to validate the testing of the sensor. However, calibration of the bubble generator to ensure that the bubble generator is accurately generating bubbles of a desired size is difficult.

Known calibration systems for the bubble generator are inaccurate, labor intensive, and time consuming. For example, known calibration systems for bubble generators use an aggregated collection of many air bubbles in a graduated cylinder to determine an average size of the air bubbles (total volume of air bubbles collected divided by total number of air bubbles collected). Such method only yields average size of the air bubbles, but the consistency in size of each air bubble cannot be validated using such technique. Moreover, such systems are unable to test various, controlled sizes of air bubbles and/or air bubbles moving at different velocities and/or air bubbles released at different rates. Some systems have been developed that use a vision system to image bubbles to measure their dimension. However, detection of bubbles of different size with such systems is difficult, particularly for small bubbles. Small bubbles may occur when bubbles split, such as when crossing transitions between different tubes. Bubble splits not only influence the results of bubble detection (two bubbles can be recognized as one), but also cause problems with bubble tracking, which reduces the recordable bubble dimension information. The vision-based measurement systems suffer from problems in counting and measuring bubbles, because the dimension measurements of only the first bubble in the image is recorded, making dimension estimation less accurate. Moreover, bubbles may overlap with each other at times, making it difficult to accurately detect and measure bubbles.

A need remains for a robust bubble size measurement system to measure air bubbles.

BRIEF DESCRIPTION OF THE INVENTION

In one embodiment, a bubble measurement system is provided including a bubble detector including a vessel having a flow path configured to receive a flow of fluid including air bubbles from a bubble generator and an imaging system. The imaging system includes an imaging device for imaging the fluid and air bubbles in the flow path of the vessel of the bubble detector. The imaging system has an imaging controller coupled to the imaging device and receiving images from the imaging device. The imaging controller processes the images to measure bubble size of each air bubble passing through the bubble detector. The imaging controller includes a pairing module comparing successive images and the air bubbles in successive images to measure all bubbles flowing through the vessel.

In another embodiment, a bubble measurement system is provided including a bubble detector including a vessel having a flow path configured to receive a flow of fluid including air bubbles from a bubble generator and an imaging system. The imaging system includes an imaging device for imaging the fluid and air bubbles in the flow path of the vessel of the bubble detector. The imaging system has an imaging controller coupled to the imaging device and receiving images from the imaging device. The imaging controller processes the images to measure bubble size of each air bubble passing through the bubble detector. The imaging controller includes a pairing module comparing successive images and the air bubbles in successive images to measure all bubbles flowing through the vessel. The pairing module includes a neural network algorithm to match air bubbles in the successive images. The pairing module performs a binary image classification analysis when the number of air bubbles in successive images differs. The binary image classification analysis determines if a bubble overlap condition has occurred. The imaging controller includes a region-based convolutional neural network (R-CNN) to perform image analysis when the bubble overlap condition occurs to measure each of the overlapping air bubbles.

In a further embodiment, a method of measuring air bubbles in fluid flowing through a vessel is provided including imaging the fluid and the air bubbles passing through a bubble detector using an imaging device, processing the images of the air bubbles to determine bubble sizes of the air bubbles, and comparing successive images and the air bubbles in successive images to measure total volume of all bubbles flowing through the vessel.

BRIEF DESCRIPTION OF THE DRAWINGS

FIG. 1 illustrates a bubble measurement system in accordance with an exemplary embodiment.

FIG. 2 illustrates images acquired by the bubble measurement system in accordance with an exemplary embodiment.

DETAILED DESCRIPTION OF THE INVENTION

Figure 3:
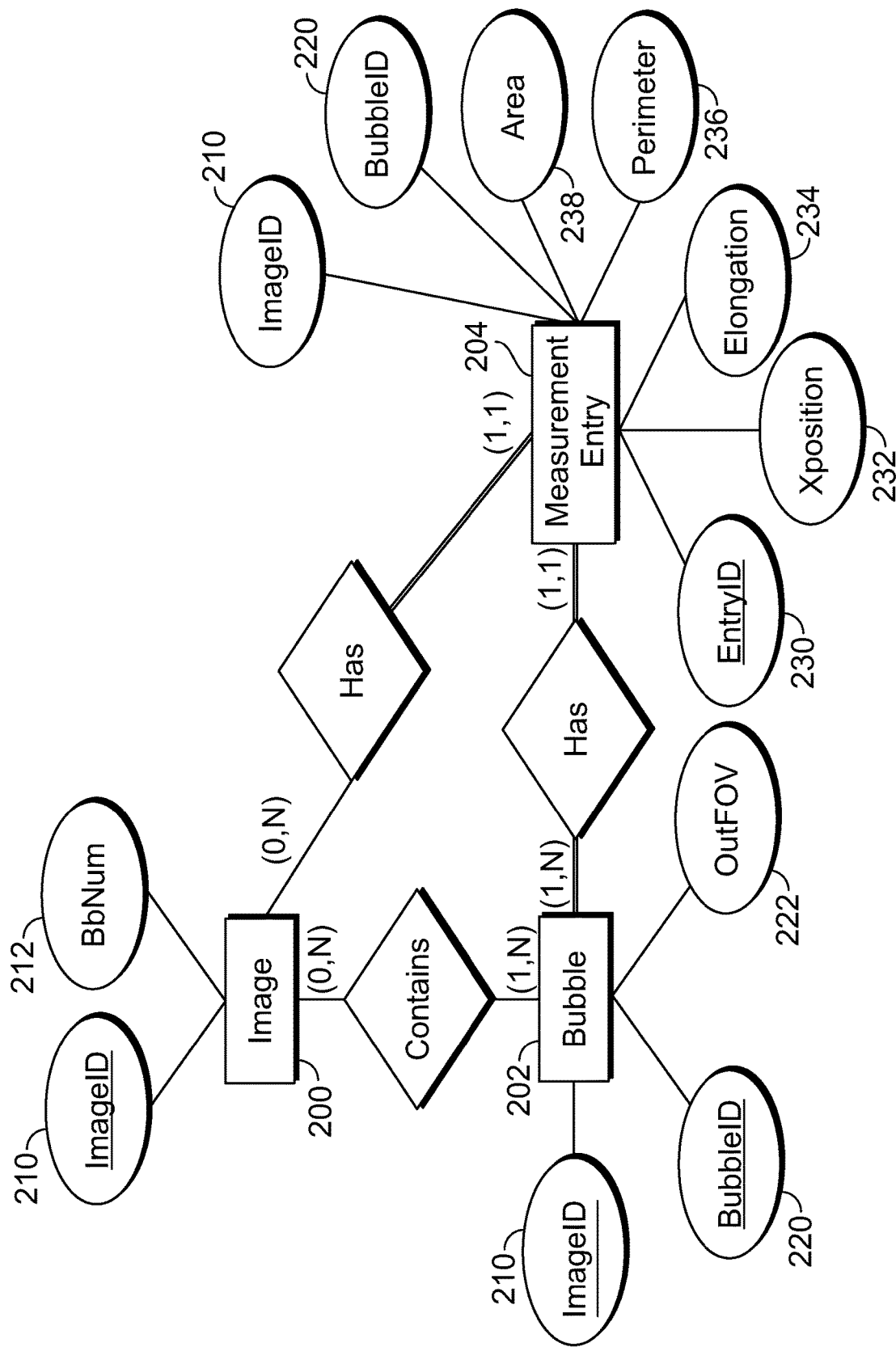
FIG. 3 is an entity relationship diagram for a bubble measurement database in accordance with an exemplary embodiment.

FIG. 1 illustrates a bubble measurement system 100 in accordance with an exemplary embodiment. In an exemplary embodiment, the bubble measurement system 100 is a vision-based bubble dimension measurement system having dynamic bubble tracking ability. The bubble measurement system 100 is used to measure characteristics of air bubbles 102 in fluid 104 flowing through a channel 106. The fluid 104 may be water or other transparent or semi-transparent fluid. The channel 106 may be formed by a vessel, a pipe, a hose, or other structure forming the channel 106. The channel 106 extends between a fluid supply reservoir 110 and a fluid discharge reservoir 112. A bubble generator 120 is used to introduce the air bubbles 102 into the fluid 104. In an exemplary embodiment, the bubble measurement system 100 is used to calibrate the bubble generator 120. The bubble measurement system 100 may be used to validate operation of the bubble generator 120, which may then be used for testing of other components, such as a bubble detection system 122.

In an exemplary embodiment, the bubble detection sensor 122 may be an ultrasonic sensor, such as the AD-101 sensor, commercially available from TE Connectivity. The bubble measurement system 100 calibrates the bubble generator 120 and/or validates operation of the bubble generator 120 for accurate testing of the bubble detection sensor 122, such as a bubble detector 124 of the bubble detection sensor 122. The bubble detection sensor 122 may be tested at the same workstation operating the bubble measurement system 100. Alternatively, the bubble measurement system 100 may be used to calibrate the bubble generator 120 and the calibrated bubble generator 120 may be removed from the bubble measurement system 100 and used a separate testing workstation to test the bubble detection sensor 122.

In an exemplary embodiment, the bubble measurement system 100 includes the bubble detector 124, an imaging system 126 associated with the bubble detector 124, and a lighting system 128 associated with the bubble detector 124 and the imaging system 126. The air bubbles 102 and the fluid 104 flows through the bubble detector 124. The imaging system 126 images the air bubbles 102 in the fluid 104 and analyzes the images to measure characteristics of the air bubbles 102. For example, the bubble measurement system 100 may be used to measure the size of the air bubbles 102 by imaging the air bubbles 102 passing through the bubble detector 124. For example, the bubble measurement system 100 may measure the diameter of the air bubble 102 and/or the perimeter of the air bubble 102 and/or the elongation of the air bubble 102 and/or the area of the air bubble 102 to determine the air bubble size. The bubble measurement system 100 may calculate a volume of the air bubble 102 based on the measured characteristics of the air bubbles 102 in the image. The lighting system 128 enhances the images by providing appropriate lighting to image the air bubbles 102 in the fluid 104.

In an exemplary embodiment, the imaging system 126 provides a feedback loop to the bubble generator 120 to control operation of the bubble generator 120, such as for proper calibration of the bubble generator 120. The bubble measurement system 100 may be configured to generate an error correction for the bubble generator 120 being tested. For example, the bubble measurement system 100 may use the known bubble size from the bubble generator 120 and the output from the bubble detector 124 to generate error correction curves that may be input into the bubble generator 120 to calibrate the bubble generator 120. Thus, the bubble detector 124 may be used to calibrate the bubble generator 120. The bubble generator 120 of the bubble measurement system 100 may be configured to generate bubbles of known bubble size. The output of the bubble detector being tested may be used to create error correction curves for the particular device under test. As such, the device may be calibrated to give the bubble detector 124 the capability to measure bubbles with high accuracy and resolution. After calibration/validation of the bubble detector 124, the bubble detector 124 may be used in other systems, such as a medical application to measure or monitor air bubbles in IV tubes.

The bubble generator 120 is operated to control the size of the air bubbles 102 and the frequency of the air bubbles 102. For example, the bubble generator 120 may control opening and closing of a valve to control the size and frequency of the air bubbles 102. In various embodiments, the pressure of the airflow may be controlled, such as to increase or decrease the flow rate of the air bubbles 102 in the channel 106. Feedback or control signals from the bubble measurement system 100 may be used to control one or more operating parameters of the bubble generator 120, such as to control the air pump and/or the valve.

The bubble detector 124 is located downstream of the bubble generator 120. The channel 106 passes through the bubble detector 124 to allow the fluid 104 and the air bubbles 102 to pass through the bubble detector 124. In an exemplary embodiment, the bubble detector 124 includes a vessel 160 having a flow path 162 configured to receive the fluid 104 and the air bubbles 102. For example, the flow path 162 may be defined by a bore through the vessel 160. The flow path 162 passes through the vessel 160 between an inlet end 164 and an outlet end 166. In an exemplary embodiment, the vessel 160 is transparent. For example, the vessel 160 may be a glass tube or a plastic tube. The vessel 160 may be cylindrical in various embodiments. In such embodiments, the flow path 162 may be cylindrical. The flow path 162 may have other cross-sections in alternative embodiments. Optionally, multiple vessels 160 may be provided along the flow path 162. For example, multiple tubs or other components may be joined together, such as having one component plugged into the end of another component. At such transitions, the air bubbles 102 may be affected, such as causing the air bubbles 102 to split into multiple air bubbles 102. In an exemplary embodiment, the bubble measurement system 100 may be configured to identify and measure the split air bubbles 102.

The imaging system 126 is used to image the air bubbles 102 passing through the bubble detector 124. The imaging system 126 includes an imaging device 170 and an imaging controller 172 coupled to the imaging device 170. The imaging device 170 takes digital images of the vessel 160 including the fluid 104 and the air bubbles 102, when present. The images may be still images or video images. In an exemplary embodiment, the imaging device 170 includes a camera 180 and a lens 182. The camera 180 may be a high speed, high resolution camera. In various embodiments, the camera 180 may capture multiple images per second. In an exemplary embodiment, the lens 182 is a telecentric lens. Other types of lenses may be used in alternative embodiments.

In an exemplary embodiment, the imaging controller 172 receives the images from the imaging device 170 and processes the images. In an exemplary embodiment, the imaging controller 172 processes the images to measure characteristics of each air bubble 102 passing through the bubble detector 124. For example, the imaging controller 172 may measure the size of the air bubble 102. The imaging controller 172 may measure the flow rate of the fluid 104 and the air bubble 102 through the bubble detector 124. The imaging controller 172 may measure the number of air bubbles 102 passing through the bubble detector 124 during a calibration or testing cycle.

In an exemplary embodiment, the imaging controller 172 includes a pairing module 174 to compare images and/or measurement data relating to the bubbles to pair the bubbles in successive images for bubble tracking and measuring all bubbles flowing through the vessel 160. The pairing module 174 may compare successive images to determine when the air bubbles 102 enter a field of view of the bubble detector 124 and when the air bubbles exit the field of view of the bubble detector 124. The pairing module 174 may include a neural network algorithm to match air bubbles 102 in the successive images. The pairing module 174 may use positional data of the air bubbles 102 in the successive images and may use the measurement data of the air bubbles 102 in the successive images to match the air bubbles 102 between the successive images. The pairing module 174 may include a Gale-Shapley algorithm to find optimal pairings of the air bubbles 102 in the successive images. The pairing module 174 may perform a binary image classification analysis when the number of air bubbles 102 in successive images differs to determine if a bubble overlap condition has occurred. The pairing module 174 may include a support vector machine (SVM) classifier to perform the binary image classification analysis and determine if a bubble overlap condition has occurred. The images may be further processed if there is bubble overlap to more accurately measure the air bubbles 102.

In an exemplary embodiment, the imaging controller 172 may store the images and/or the results of the analysis. The imaging controller 172 may output the result of the analysis, such as to the bubble generator 120. For example, the imaging controller 172 may output the results of the analysis to the controller for the bubble generator 120, such as for comparison of the results with the control parameters for the bubble generator 120. If there are any errors or deviation between the results from the bubble measurement system 100 and the control parameters for the bubble generator 120, the bubble generator 120 may be updated and calibrated to equalize the measured results with the control parameters.

During operation of the bubble measurement system 100, the bubble generator 120 and/or the bubble detector 124 may be validated and/or calibrated. The bubble generator 120 operates and maintains predetermined settings, such as bubble size, bubble amount, bubble rate, pressure, flow rate, and the like. The imaging device 170 is triggered and starts to acquire images. The imaging controller 172 analyzes the images from the imaging device 170. The imaging controller 172 identifies the air bubbles 102 in the images. The imaging controller 172 measures characteristics of the air bubble 102, such as the bubble size, the bubble shape, the number of bubbles, the bubble flow rate, and the like. The imaging controller 172 provides measurements for each individual air bubble 102 generated by the bubble generator 120. The results of the measurements may be transmitted from the imaging controller 172 to the bubble generator 120 in a feedback loop for comparison and calibration of the bubble generator 120. The bubble generator 120 may make any necessary corrections to the components of the bubble generator 120 to calibrate the output of the bubble generator 120 to the setpoints. The bubble measurement system 100 may be used to control set up of the bubble generator 120. By measuring the individual air bubbles and providing feedback to the bubble generator 120, the bubble measurement system 100 improves repeatability, consistency, and accuracy of the bubble generator 120 for proper testing of the bubble detection sensor 122. In various embodiments, the bubble measurement system 100 may include correction factors for proper analysis based on the type of fluid use, the viscosity of the fluid, the temperature of the fluid, the flow rate of the fluid, the pressure of the fluid, and the like.

In an exemplary embodiment, the bubble measurement system 100 uses an AI-based optimal pairing approach for continuous bubble tracking, so that all bubble dimension measurements can be recorded correctly even when there are bubble splits and overlapping bubbles. The bubble measurement system 100 uses a database to store the image information and bubble measurements for analysis. The air bubbles 102 may be detected and measured with a measurement tool, such as with blob analysis. In an exemplary embodiment, the bubble measurement system 100 compares air bubbles 102 in adjacent images to ensure that all bubbles are measured and counted. In various embodiments, bubble tracking between two images is performed by the pairing module 174 of the system that performs an optimal pairing test to pair the bubbles in the images. The system marks the bubble measurement with unique bubble IDs. In a scenario where the images have different numbers of bubbles detected, further image analysis may be performed, such as using a Support Vector Machine (SVM) based pattern recognition method to detect a bubble overlap scenario where the small bubble moves too close to the large bubble. In this scenario, blob analysis may recognize the overlapping bubbles as one bubble, leading to incorrect measurement values. If the overlap pattern is recognized, image segmentation may be performed, such as using a region-based convolutional neural network (R-CNN), to detect and measure both bubbles. Then, the information is stored in a database and optimal paring may be performed using the data based on each of the unique Bubble IDs. The dimension measurements are stored in the database based on both image ID and bubble ID so the data can be easily aggregated and analyzed based on user needs for statistical analysis. Statistical analysis can be performed using the database records and the accurate measurement data of all of the air bubbles. No dimension measurements will be missing due to bubble splits or overlapping bubbles.

FIG. 2 illustrates successive images acquired by the bubble measurement system 100 in accordance with an exemplary embodiment showing air bubbles 102 advancing through the vessel 160 (in an x-direction). FIG. 2 shows five images (i, i+1, i+2, i+3, i+4). The system may analyze any number of images, such as hundreds or thousands of images. The imaging device focuses on the vessel 160 of the bubble detector 124. The fluid 104 and the air bubbles 102 are visible through the transparent vessel 160. The relative positions of the air bubbles 102 may change through the various images and the system is able to track the air bubbles 102 through the various images.

The imaging controller 172 analyzes the images to measure the sizes of the air bubbles 102. In various embodiments, the imaging controller 172 may have a boundary recognition tool, such as a blob analysis tool, to identify the boundary of each air bubble 102 to measure the size and/or shape of the air bubble 102. In an exemplary embodiment, the imaging controller 172 measures a perimeter of the air bubble 102 using the boundary recognition tool. In an exemplary embodiment, the imaging controller 172 determines an area of the air bubble 102 using the boundary recognition tool. The imaging controller 172 may determine an amount of elongation of the air bubble 102 by comparing different dimensions of the air bubble 102. In an exemplary embodiment, the imaging controller 172 determines a volume of the air bubble 102 by taking a measurement of a diameter of the air bubble 102. In an exemplary embodiment, the imaging controller 172 calculates a volume of the air bubble 102 based on the measurements of the air bubble 102. Other measurement techniques may be performed in alternative embodiments.

In various embodiments, the shape of the air bubble is determined using boundary recognition. The shape of the air bubble may be determined by comparing a width versus a height of the air bubble to determine roundness of the air bubble (for example to determine if the air bubble is circular or elongated, such as being oval). The shape of the air bubble may be determined to calculate flowrate and/or pressure of the fluid. For example, at higher flowrate or higher pressure, the air bubble 102 may be obround, such as being elongated in an oval-shape.

In various embodiments, the air bubbles 102 may be detected at different locations along the vessel 160 within the field of view (different X-positions). For example, the same air bubble 102 may be imaged multiple times as the air bubble 102 flows through the vessel 160. The flow rate of the air bubble 102 may be determined by comparing relative positions of the air bubble 102 in different images. The imaging controller 172 analyzes the image to determine the number of air bubbles 102 visible in the field of view. Each air bubble 102 in the image may be analyzed (for example, measured) and tracked. The successive images are compared to track the air bubbles 102 and make sure all of the air bubbles 102 passing through the vessel 160 are measured. The imaging controller 172 determines when air bubbles 102 enter and leave the field of view. The imaging controller 172 determines if split air bubbles 102 occurs. The imaging controller 172 determines when bubble overlap conditions (for example, image i+3) of the air bubbles 102 occur and may provide additional image analysis to measure the air bubbles 102 when bubble overlap occurs.

FIG. 3 is an entity relationship diagram for a bubble measurement database in accordance with an exemplary embodiment. The database uses three tables, namely an image table 200, a bubble table 202 and a measurement entry table 204.

In the image table 200, each captured image has two attributes including an image ID 210 and the number of bubbles 212 detected in the image. In the bubble table 202, each unique bubble has its own bubble ID 220 and a Boolean variable 222 suggesting if the bubble is outside the field of view. The image IDs 210 associated with the images containing the particular bubble are identified in the bubble table 202. The measurement entry table 204 includes an entry ID 230 as well as the image ID 210 and the bubble ID 220 associated with the particular bubble and the images containing the bubble. The measurement entry table 204 includes measurement attributes for each bubble. The measurement attributes may include the X position measurement 232, the elongation measurement 234, the perimeter measurement 236, and the area measurement 238. Other measurement attributes may be provided, such as a volume measurement. The measurement data is used by the bubble measurement system 100 for validation/calibration of the bubble generator 120 and/or the bubble detector 124. In an exemplary embodiment, the measurement data is used to obtain bubble matching preference values between two bubbles. The measurement data may be used to recognize and identify when bubble overlap conditions occur. The measurement data may be used to pair bubbles in different images.

Figure 4:
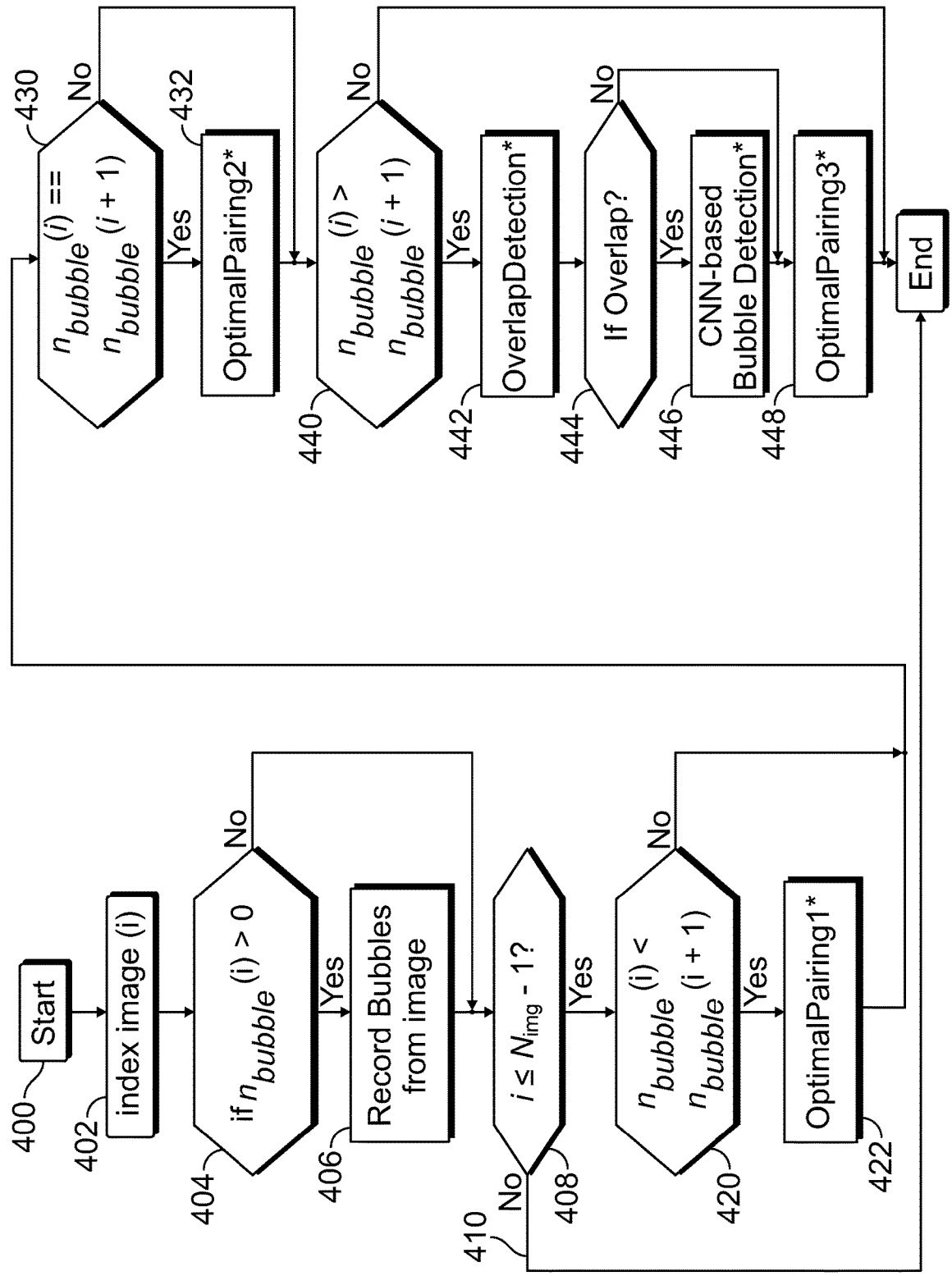
FIG. 4 is a flowchart showing operation of the bubble measurement system in accordance with an exemplary embodiment.

FIG. 4 is a flowchart showing operation of the bubble measurement system 100 in accordance with an exemplary embodiment. References are made back to FIG. 1 for the various components of the bubble measurement system 100. The flowchart illustrates a workflow algorithm of the imaging system 126 for tracking the air bubbles 102 in the fluid 104 flowing through the vessel 160. In an exemplary embodiment, the method of operating the imaging system 126 improves bubble measurement accuracy by providing improved bubble tracking through successive images. The method of operating the imaging system 126 is able to track split air bubbles to improve bubble measurement accuracy. The method of operating the imaging system 126 is able to track air bubble overlaps to improve bubble measurement accuracy. Optionally, the bubble measurement and analysis may be performed offline, such as after the test is performed. Alternatively, the bubble measurement and analysis may be performed in real-time during the testing of the bubble generator 120 and the bubble detector 124.

In an exemplary embodiment, the workflow algorithm is used for dynamic bubble tracking and matching of bubbles in different images. The imaging system 126 continuously pairs the air bubbles into adjacent images to implement a bubble tracking effect and ensure that all bubbles are identified and measured. The workflow algorithm is initiated at step 400 and indexed to the next image at step 402. If this is a first iteration of the workflow algorithm, the system indexes to the first image. If this is not the first iteration of the workflow algorithm, the system indexes to the next image (for example, second image, then third image, etc.).

At 404, the system determines if the image contains at least one bubble, such as by determining if the number of bubbles ($n_{bubble}$) is greater than 0. If the image does contain a bubble, the system records 406 the bubbles from the image with techniques like blob analysis. If the image does not contain a bubble, the system bypasses step 406.

At 408, the system determines if there are additional images in the index, such as by determining if the image (i) is less than or equal to the total number of images−1 ($N_{img}$−1). If the current image is the last image, the workflow proceeds at 410 to end the workflow. For example, if the current images the last image, there are no further images for the current image to compare to so the workflow ends. However, if there are additional images in the index, the workflow continues and the system compares the images by comparing the number of bubbles in the successive images, such as to determine if the number of bubbles increases, decreases or remains constant between the successive images.

At 420, the system determines if the number of bubbles in the current image ($n_{bubble}(i)$) is less than the number of bubbles in the next image ($n_{bubble}(i+1)$). The system is able to determine if a new bubble arrives in the next image by comparing the current image and the next image. For example, if the current image contains two bubbles and the next image contains three bubbles, the system is able to determine that a new bubble arrives in the field of view from the current image to the next image. At 422, the system performs an optimal pairing test (see, for example, FIG. 5) to pair the bubble(s) in the current image with the bubble(s) in the next image. For example, the imaging system 172 may include the pairing module 174 to pair the bubbles in the images. In various embodiments, the pairing module 174 uses a Gale-Shapley algorithm to find optimal pairings of the air bubbles in the successive images. The optimal pairing test is used to pair each of the bubbles in the current image with the corresponding bubbles in the next image to track the bubbles through the field of view. However, if the number of bubbles in the current image is NOT less than the number of bubbles in the next image, the workflow bypasses step 422.

At 430, the system determines if the number of bubbles in the current image is equal to the number of bubbles in the next image. At 432, the system performs an optimal pairing test to pair the bubble(s) in the current image with the bubble(s) in the next image to track the bubbles through the field of view. However, if the number of bubbles in the current image is NOT equal to the number of bubbles in the next image, the workflow bypasses step 432.

At 440, the system determines if the number of bubbles in the current image is greater than the number of bubbles in the next image. The system may determine if a bubble moves out of the field of view by comparing the current image and the next image. The system may determine that a bubble overlap condition (see, for example, FIG. 6) occurs by comparing the current image and the next image. For example, if the current image contains three bubbles and the next image contains two bubbles, the system may determine that one of the bubbles has advanced out of the field of view or that one bubble is at least partially overlapping with another bubble from the current image to the next image.

At 442, the system performs an overlap detection test for bubble overlap recognition. At 444, the pairing module determines if an overlap condition occurs. In an exemplary embodiment, the pairing module performs the overlap detection test by comparing the images, such as comparing the measurements of the images contained in the measurement database. The pairing module may perform a binary image classification analysis when the number of air bubbles in successive images differs to determine if a bubble overlap condition has occurred. The pairing module may include a support vector machine (SVM) classifier to perform the binary image classification analysis. The pairing module may use the X position data to determine if a bubble overlap condition has occurred. For example, if the bubbles are in close proximity in the successive images or if the bubbles are remote from the end of the field of view, then bubble overlap is more likely and the loss of the bubble is less likely to have left the field of view. However, if the bubbles are spaced far apart from each other in the successive images or if the bubbles are near the end of the field of view, then bubble overlap is less likely and having one of the bubbles leave the field of view is more likely. The pairing module may use the measurement data to determine if a bubble overlap condition has occurred. For example, if bubble measurements change unexpectedly (for example, elongation or area or perimeter increases between the images), then the pairing module may determine that an overlapping condition has occurred.

If the overlap condition has occurred, the workflow proceeds to step 446 and the system performs image segmentation for bubble detection. For example, the system may include a convolutional neural network (CNN) when the bubble overlap condition occurs to measure each of the overlapping air bubbles. In an exemplary embodiment, the imaging controller includes a region-based convolutional neural network (R-CNN), such as a Mask R-CNN, to perform image analysis. The R-CNN provides more accurate measurement data than blob analysis and is used in the bubble overlap situation for bubble measurement. The system identifies overlapping patterns and is able to calculate measurements of both bubbles, including the bubble that is overlapped in the image. The system may process pixel data of the overlapping regions to accurately measure both bubbles, including the overlapped portion. The output of the system (for example, using the Mask R-CNN) includes the pixel position of the detected objects, so that the measurement information, including perimeter, area, XPosition, and elongation, can be obtained indirectly and accurately. As such, all bubbles in the image are accurately measured for proper pairing between the images. However, if the system determines that an overlap condition is not occurring, the workflow bypasses step 446. Such conditional may occur when the number of bubbles in the current image is greater than the next image and no overlapping condition exists, such as when one of the bubbles has moved outside of the field of view.

At 448, the system performs an optimal pairing test to pair the bubble(s) in the current image with the bubble(s) in the next image. The optimal pairing is performed after the image segmentation occurs and the measurements of each bubble are calculated. The optimal pairing test is used to pair each of the bubbles in the current image with the corresponding bubbles in the next image to track the bubbles through the field of view. However, if the number of bubbles in the current image is NOT greater than the number of bubbles in the next image, the workflow bypasses steps 442, 444, 446, and 448.

After all three scenarios are considered (number of bubbles is less, number of bubbles is equal, number of bubbles is greater), the optimal pairings for the bubbles in the images is determined. The bubble tracking for such set of images (for example, comparison of image 1 and image 2) is complete and the process ends. A new process can be iterated for the next set of images (for example, image 2 and image 3).

The system uses the measurements to validate operation of the bubble generator 120 or the bubble detector 124. If operation is not validated, the system may use the measurements to calibrate the bubble generator 120 or the bubble detector 124. For example, control settings of one or more of the components may be adjusted to correct for the error. For example, the system may adjust one or more operating parameters of the air pump and/or the valve of the bubble generator to calibrate the bubble generator 120. The system may adjust the boundary recognition tool or measurement sensors to calibrate the bubble detector 124. The bubble generator 120 and the bubble detector 124 are calibrated based on actual measured bubble characteristics of the air bubbles.

Figure 5:
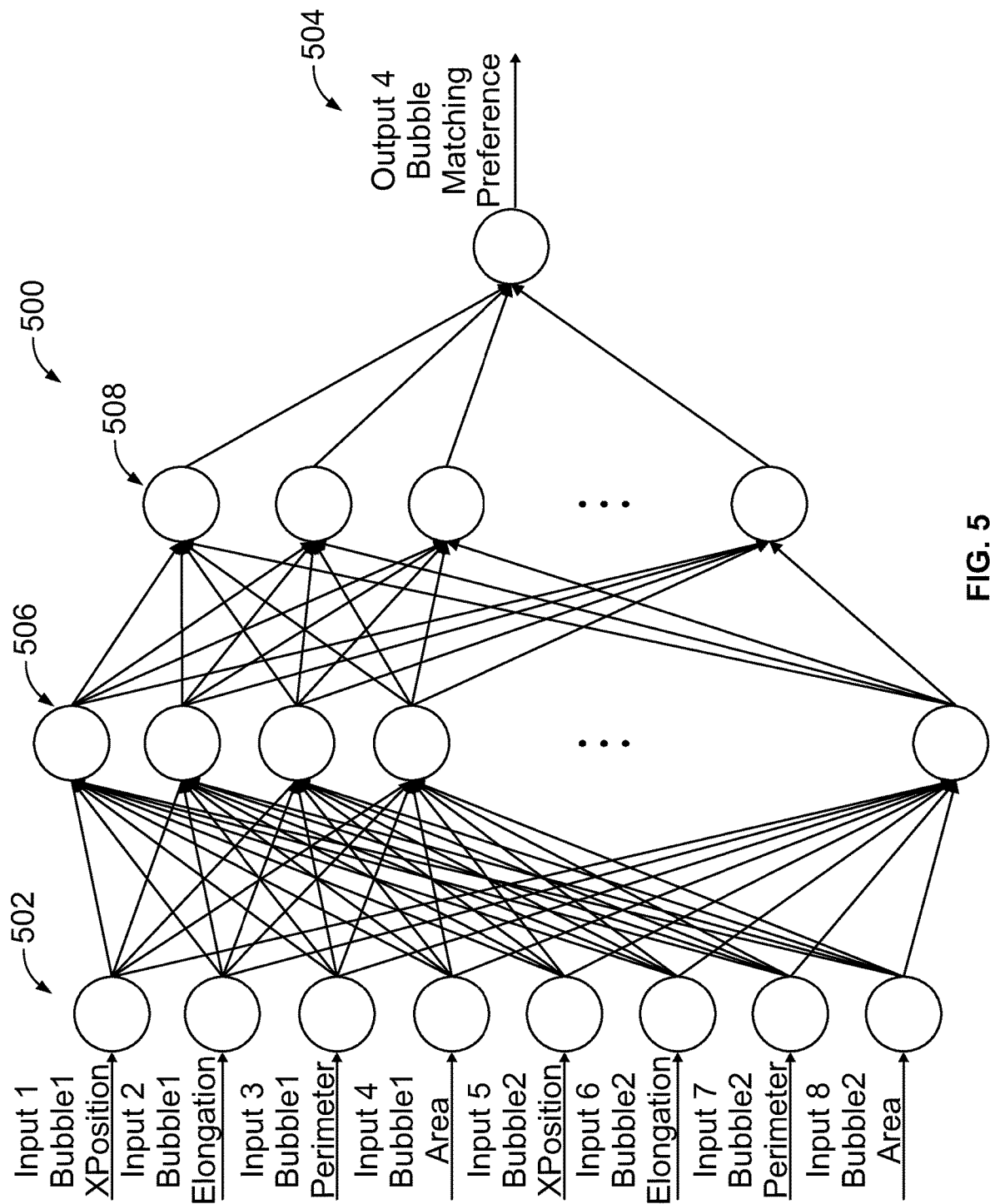
FIG. 5 is a bubble pairing neural network in accordance with an exemplary embodiment.

FIG. 5 is a bubble pairing neural network 500 in accordance with an exemplary embodiment. The bubble pairing neural network 500 may use a Gale-Shapley algorithm to find optimal pairings of the air bubbles in the successive images and solves the bubble pairing as a stable-marriage problem. The bubble pairing neural network 500 uses inputs 502 for each of the bubbles being paired to generate an output 504. The output 504 may be a bubble matching preference value for the bubbles. The bubble pairing neural network 500 makes bubble matching preference predictions to predict if two bubbles are the same bubble in two images. In various embodiments, the bubble pairing neural network 500 may be a 4-layer neural network having hidden layers 506, 508.

In an exemplary embodiment, the bubble pairing neural network 500 uses measurement data for each bubble as the inputs 502. For example, the bubble pairing neural network 500 may use X position data, elongation data, perimeter data, and area data for both of the bubbles as inputs. Other bubble measurement data may be used in alternative embodiments. In an exemplary embodiment, the bubble pairing neural network 500 outputs a bubble matching preference value for the pairing as the output 504. The bubble matching preference value may be a fractional number between 0 and 1, with 0 being no match and 1 being an exact match. The pairing of bubbles is conducted using the Gale-Shapley algorithm based on the predicted matching preference values.

In an exemplary embodiment, when the numbers of bubbles in two images are different, excess bubbles will be ignored to implement the bubble pairing neural network 500. The scenario with the maximum sum of matching preference value is when the optimal pairing happens. The excess bubbles are considered as out of field of view (if there are more bubbles in the previous image) or marked as new bubbles (if there are less bubbles in the previous image). In an example having three bubbles B11, B12, and B13 in the first image and having two bubbles B21, and B22 in the second image, the bubble pairing neural network 500 analyzes all combinations {B11, B12, B21, B22}, {B11, B13, B21, B22}, and {B12, B13, B21, B22} in different optimal pairing tests to determine which combination has the maximum sum of matching preference value. The combination with the maximum matching preference values is chosen as the input of the Gale-Shapley algorithm to find the optimal pairing.

Figure 6:
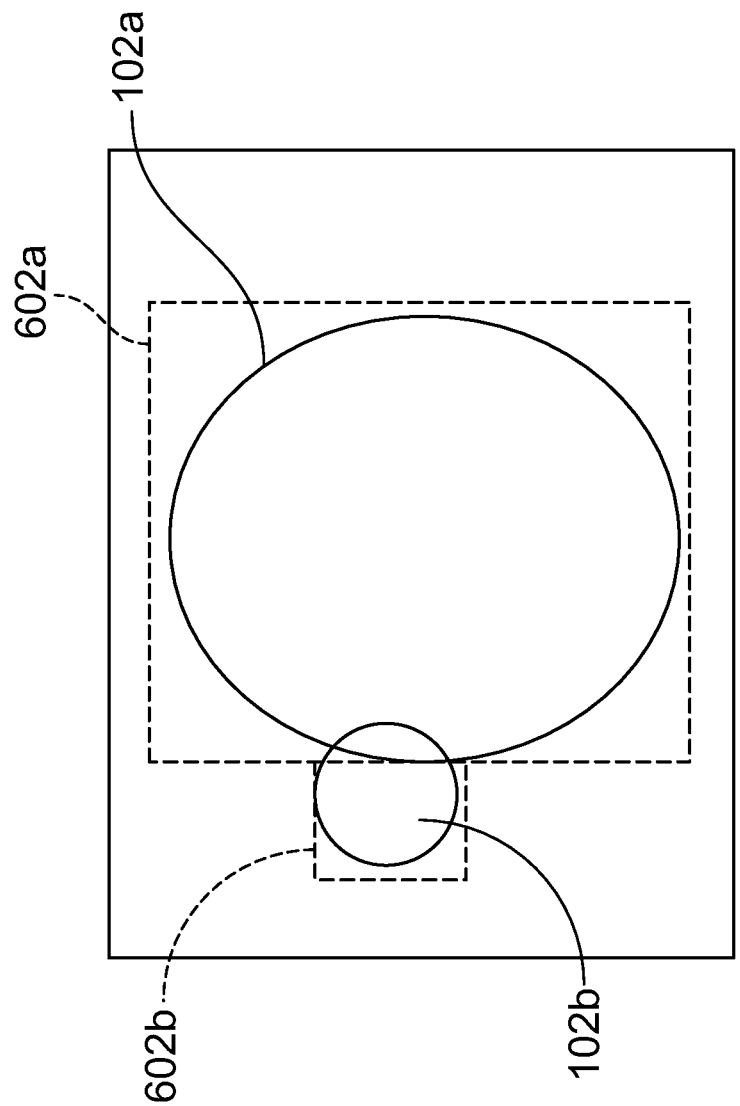
FIG. 6 illustrates an image acquired by the bubble measurement system in accordance with an exemplary embodiment.

FIG. 6 illustrates an image acquired by the bubble measurement system 100 in accordance with an exemplary embodiment showing an overlapping condition of multiple air bubbles 102a, 102b. The air bubbles 102a, 102b may split, such as when passing through a transition where two tubes intersect. As the split air bubbles 102a, 102b advance through the channel 106, the air bubbles 102a, 102b may move at different rates. Eventually, the air bubbles 102a, 102b may overlap and pass one another. In the overlapped condition, it may be difficult to accurately measure and determine measurement data for both air bubbles 102a, 102b. For example, blob analysis (for example, boundary recognition by a boundary recognition tool) may be unable to accurately measure both air bubbles 102a, 102b or even identify the presence of both air bubbles 102a, 102b. For example, the simplistic blob analysis may identify air bubbles 102a, 102b as a single air bubble.

In an exemplary embodiment, the bubble measurement system 100 uses a region-based convolutional neural network (R-CNN), such as a Mask R-CNN, for overlapped bubble detection and measurement. The Mask R-CNN marks the regions of the overlapped objects, such as with rectangular regions 602a, 602b. The Mask R-CNN performs image segmentation to analyze the air bubbles 102a, 102b in both regions 602a, 602b. The Mask R-CNN generates a segmentation mask for each air bubble 102a, 102b. Pixel data in both regions 602a, 602b can be analyzed to measure both air bubbles 102a, 102b. Measurement data may be determined for both air bubbles 102a, 102b, including X position data, elongation data, the perimeter data, and the area data for each of the air bubbles 102a, 102b.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A bubble measurement system comprising:
a bubble detector including a vessel having a flow path configured to receive a flow of fluid including air bubbles from a bubble generator; and
an imaging system having an imaging device for imaging the fluid and air bubbles in the flow path of the vessel of the bubble detector, the imaging system having an imaging controller coupled to the imaging device and receiving images from the imaging device, the imaging controller processing the images to measure bubble size of each air bubble passing through the bubble detector, the imaging controller including a pairing module comparing successive images and the air bubbles in successive images to measure all bubbles flowing through the vessel, and the pairing module identifying bubble overlap conditions.

2. The bubble measurement system of claim 1, wherein the pairing module compares successive images to determine when the air bubbles enter a field of view of the imaging device and when the air bubbles exit the field of view of the imaging device.

3. The bubble measurement system of claim 1, wherein the pairing module includes a neural network algorithm to match air bubbles in the successive images.

4. The bubble measurement system of claim 1, wherein the pairing module uses positional data of the air bubbles in the successive images and uses measurement data of the air bubbles in the successive images to match the air bubbles between the successive images.

5. The bubble measurement system of claim 4, wherein the measurement data includes elongation data, perimeter data, and area data of the air bubbles in the successive images to match the air bubbles between the successive images.

6. The bubble measurement system of claim 1, wherein the pairing module uses a Gale-Shapley algorithm to find optimal pairings of the air bubbles in the successive images.

7. The bubble measurement system of claim 1, wherein the pairing module performs a binary image classification analysis when the number of air bubbles in successive images differs, the binary image classification analysis determining if a bubble overlap condition has occurred.

8. The bubble measurement system of claim 7, wherein the pairing module includes a support vector machine (SVM) classifier to perform the binary image classification analysis.

9. The bubble measurement system of claim 7, wherein the imaging controller includes a region-based convolutional neural network (R-CNN) to perform image analysis when the bubble overlap condition occurs to measure each of the overlapping air bubbles.

10. The bubble measurement system of claim 1, wherein the imaging system includes a measurement database having inputs including an image ID for each image, a bubble ID for each bubble, and measurement data for each bubble in each image, the pairing module using the inputs from the measurement database to analyze the successive images.

11. The bubble measurement system of claim 1, wherein the imaging system includes a validation module using the bubble measurements to validate operation of the bubble detector.

12. The bubble measurement system of claim 1, wherein the imaging system includes a calibration module using the bubble measurements to calibrate operation of the bubble detector.

13. A bubble measurement system comprising:
a bubble detector including a vessel having a flow path configured to receive a flow of fluid including air bubbles from a bubble generator; and
an imaging system having an imaging device for imaging the fluid and air bubbles in the flow path of the vessel of the bubble detector, the imaging system having an imaging controller coupled to the imaging device and receiving images from the imaging device, the imaging controller processing the images to measure bubble size of each air bubble passing through the bubble detector, the imaging controller including a pairing module comparing successive images and the air bubbles in successive images to measure all bubbles flowing through the vessel, the pairing module including a neural network algorithm to match air bubbles in the successive images;
wherein the pairing module performs a binary image classification analysis when the number of air bubbles in successive images differs, the binary image classification analysis determining if a bubble overlap condition has occurred; and
wherein the imaging controller includes a region-based convolutional neural network (R-CNN) to perform image analysis when the bubble overlap condition occurs to measure each of the overlapping air bubbles.

14. The bubble measurement system of claim 13, wherein the pairing module compares successive images to determine when the air bubbles enter a field of view of the imaging device and when the air bubbles exit the field of view of the imaging device.

15. The bubble measurement system of claim 13, wherein the pairing module uses positional data of the air bubbles in the successive images and uses measurement data of the air bubbles in the successive images to match the air bubbles between the successive images.

16. The bubble measurement system of claim 13, wherein the neural network algorithm is a Gale-Shapley algorithm to find optimal pairings of the air bubbles in the successive images.

17. The bubble measurement system of claim 13, wherein the pairing module includes a support vector machine (SVM) classifier to perform the binary image classification analysis.

18. The bubble measurement system of claim 13, wherein the imaging controller includes a region-based convolutional neural network (R-CNN) to perform image analysis when the bubble overlap condition occurs to measure each of the overlapping air bubbles.

19. The bubble measurement system of claim 13, wherein the imaging system includes a measurement database having inputs including an image ID for each image, a bubble ID for each bubble, and measurement data for each bubble in each image, the pairing module using the inputs from the measurement database to analyze the successive images.

20. A method of measuring air bubbles in fluid flowing through a vessel, the method comprising:
imaging the fluid and the air bubbles passing through a bubble detector using an imaging device;
processing the images of the air bubbles to determine bubble sizes of the air bubbles; and
comparing successive images and the air bubbles in successive images to measure total volume of all bubbles flowing through the vessel and to identify when bubble overlap conditions occur.

21. The method of claim 20, further comprising using a neural network algorithm to match air bubbles in the successive images.

22. The method of claim 20, further comprising performing a binary image classification analysis when the number of air bubbles in successive images differs to determine if a bubble overlap condition has occurred.

23. The method of claim 22, further comprising performing image analysis using a region-based convolutional neural network (R-CNN) when the bubble overlap condition occurs to measure each of the overlapping air bubbles.

24. The method of claim 20, validating operation of the bubble detector based on the measured total volume of all of the bubbles flowing through the vessel.

25. The method of claim 20, calibrating operation of the bubble detector based on the measured total volume of all of the bubbles flowing through the vessel.

* * * * *